United States Patent
Fattic

(10) Patent No.: US 7,475,673 B1
(45) Date of Patent: Jan. 13, 2009

(54) APPARATUS AND METHOD FOR CONTROLLING MAXIMUM CYLINDER PRESSURE IN AN INTERNAL COMBUSTION ENGINE

(75) Inventor: Gerald T. Fattic, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 8 days.

(21) Appl. No.: 11/879,454

(22) Filed: Jul. 17, 2007

(51) Int. Cl.
F02M 7/00 (2006.01)
F02M 51/00 (2006.01)

(52) U.S. Cl. .......................... 123/435; 123/436; 123/478

(58) Field of Classification Search ................. 123/434, 123/435, 436, 676, 446, 478, 480; 73/114.74
See application file for complete search history.

(56) References Cited

U.S. PATENT DOCUMENTS

| | | | |
|---|---|---|---|
| 5,582,151 A * | 12/1996 | Wertheimer | ................. 123/435 |
| 6,557,347 B1 | 5/2003 | Alvarez et al. | |
| 6,912,852 B2 * | 7/2005 | Gottemoller et al. | .......... 60/606 |
| 6,981,488 B2 * | 1/2006 | Harris et al. | ................. 123/435 |
| 7,380,540 B1 * | 6/2008 | Duffy et al. | ................. 123/435 |

* cited by examiner

Primary Examiner—John T Kwon
(74) Attorney, Agent, or Firm—Jimmy L. Funke

(57) ABSTRACT

An Engine Control Module includes an electronic controller for controlling the position of an EGR valve, the timing of opening and closing of the engine combustion valves, and the timing of the individual cylinder fuel injectors of an engine. Each engine cylinder includes a pressure sensor. Peak cylinder pressure is sent to the ECM during each firing cycle. The ECM is programmed with required maximum percentages of EGR and optimal combustion valve timing for each engine operating condition, and sets the EGR valve and/or the camshaft phaser accordingly to adjust combustion in all the engine cylinders. The ECM also compares the measured peak pressure for each cylinder and adjusts the timing of fuel injection for the next firing cycle to trim the measured peak pressure in each cylinder to a predetermined level at or below the maximum allowable peak firing pressure for the engine.

5 Claims, 6 Drawing Sheets

APPARATUS AND METHOD FOR CONTROLLING MAXIMUM CYLINDER PRESSURE IN AN INTERNAL COMBUSTION ENGINE

TECHNICAL FIELD

The present invention relates to internal combustion engines; more particularly, to means for controlling maximum cylinder pressure in an internal combustion engine; and most particularly, to apparatus and method for controlling cylinder pressure wherein either the amount of exhaust gas recirculated into the combustion mixture or the valve actuation timing is regulated to globally limit combustion, and wherein fuel injection timing is regulated on an individual cylinder basis, hence to limit the maximum cylinder pressure obtainable in any individual cylinder.

BACKGROUND OF THE INVENTION

Excessively high pressure in an operating cylinder of an internal combustion engine may cause damage to the engine pistons, cylinder heads, and other components. Peak firing pressure is affected by the combustion process and the conditions of the incoming combustion air. In addition, the operation of a turbo-charger increases peak firing pressure by increasing the temperature and pressure of the incoming air.

Internal combustion engines, and especially diesel engines, encounter a variety of operational conditions ranging from extreme cold at sea level to high temperatures at high altitudes. These conditions may induce various engine parameters to exceed designed engine limits, for example, peak firing pressure (PFP), turbocharger speed (TS), and preturbine temperature (PTT). More specifically, the parameters are more susceptible to being exceeded when the engine is running at full load at extreme ambient temperature and/or altitude conditions.

There is also a continued demand for improved performance of diesel engines, in terms of fuel economy, component loading, power output, and reduced emissions. To facilitate optimized engine performance, conditions of combustion within the internal combustion engine should be controlled. However, engine designs are limited because of the extremes of environmental conditions under which an engine must operate. For example, cylinder PFP may become too high when an engine is operating during cold days and when the inlet air temperature is low, thus generating excessive stress on engine components. Alternatively, cylinder exhaust temperatures may become too high when the engine is operated during hot days and when the inlet air temperature is very high, thus causing turbocharger damage due to overheating and overspeed.

U.S. Pat. No. 6,557,347 discloses methods and apparatus for controlling peak firing pressure for turbo-charged diesel engines. The method includes determining an allowable peak firing pressure, determining an actual peak firing pressure, and comparing the two firing pressures to control the operation of a turbocharger for controlling peak firing pressure. The rotational speed of the turbocharger is varied to vary intake pressure and hence combustion. A controller continuously monitors intake air manifold pressure and fuel injection timing and outputs a signal to the motor-generator driving the turbocharger. This method reduces engine torque output and is applicable only globally to all the engine cylinders equally.

What is needed in the art is a method and apparatus for controlling peak firing pressure in an internal combustion engine that does not substantially reduce output torque and that can control peak firing pressure in individual cylinders of the engine.

It is a principal object of the present invention to control peak cylinder pressure in an internal combustion engine.

SUMMARY OF THE INVENTION

Briefly described, a fuel-injected internal combustion engine is provided with means for recirculating a portion of the engine exhaust gas (EGR) into the intake manifold as is know in the prior art. An Engine Control Module (ECM) includes an electronic controller for controlling the position of an EGR valve, the timing of opening and closing of the engine combustion valves, and the timing of the individual cylinder fuel injectors of the engine. Each engine cylinder is provided with a pressure sensor, and a peak cylinder pressure signal is sent to the ECM during each firing cycle. The ECM is programmed with required maximum percentages of EGR for each of the various engine operating conditions, and sets the EGR valve and/or adjusts the fueling rate accordingly to adjust globally the combustion in all the cylinders of the engine.

Further, the ECM compares the measured peak pressure for each firing of each cylinder and adjusts, by delay or advance, the timing of fuel injection for the next firing cycle to trim the measured peak pressure in each cylinder to a predetermined level at or below the maximum allowable peak firing pressure for the engine.

BRIEF DESCRIPTION OF THE DRAWINGS

The present invention will now be described, by way of example, with reference to the accompanying drawings, in which.

Corresponding reference characters indicate corresponding parts throughout the several views. The exemplifications set out herein illustrate preferred embodiments of the invention and such exemplifications are not to be construed as limiting the scope of the invention in any manner.

DESCRIPTION OF THE PREFERRED EMBODIMENTS

In a first step in a method for controlling an engine cylinder pressure at or below an allowable PFP, such a pressure is determined for an engine design based upon design parameters of the engine. The allowable pressure may be a fixed maximum value or may be calculated as a function of throttle setting signal, since in some applications the desired allowable pressure may vary during different engine operating conditions. The PFP may also define a desired peak firing pressure, which may be the same or a different value from a maximum allowable peak firing pressure, depending on for, example, operation needs of the engine.

Figure 1:
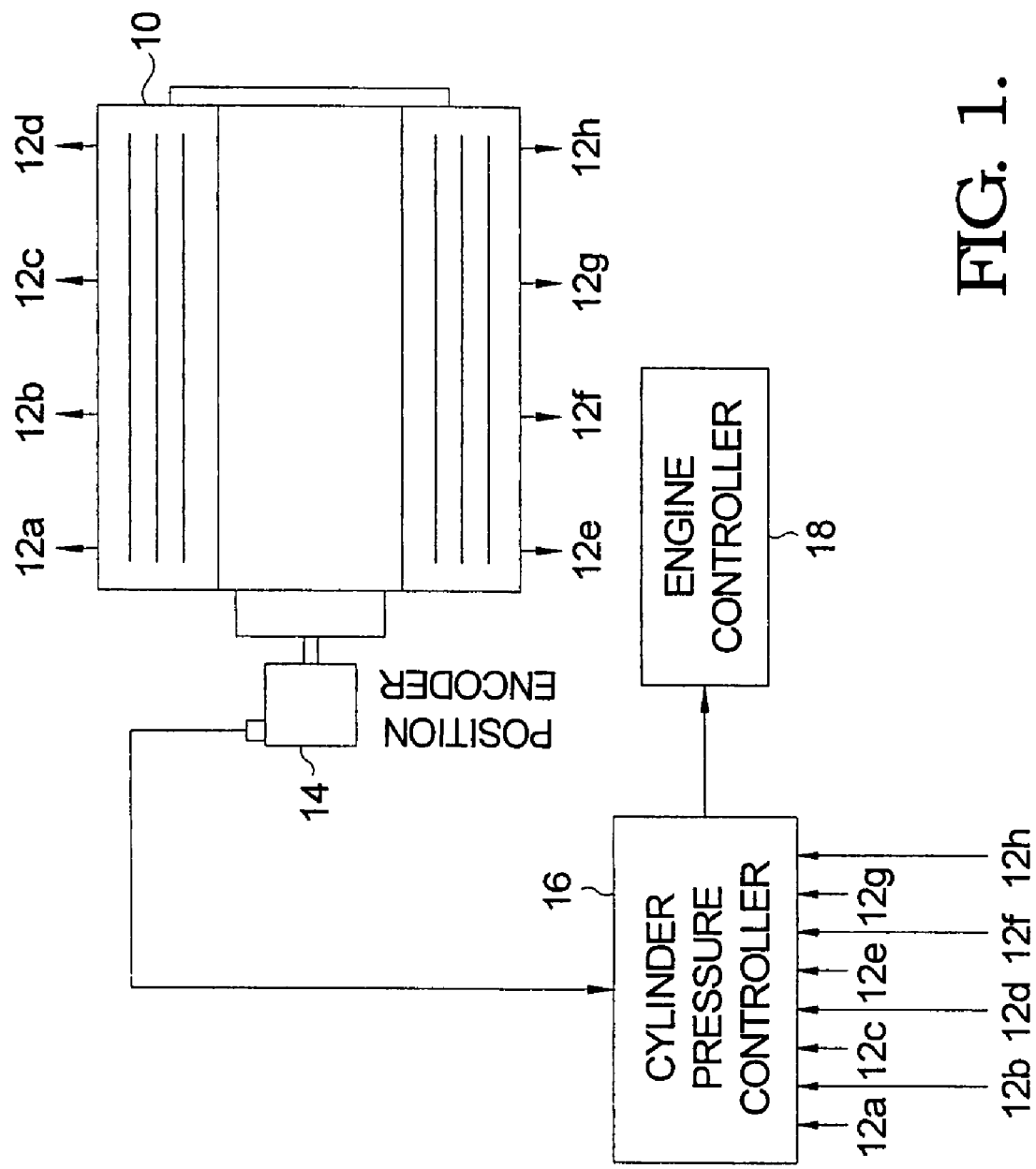
FIG. 1 is a schematic drawing of a combustion control system in accordance with the invention for a V-8 diesel engine.

Referring to FIG. 1, a V8 diesel engine 10 includes cylinder pressure sensors 12a-12h disposed in the firing chambers of the eight cylinders, respectively. A crankshaft angular position sensor (encoder) 14 is mounted on the end of the engine crankshaft to continuously indicate the angular position thereof during operation of the engine. A cylinder pressure controller 16 receives signals from the individual pressure sensors 12a-12h and also from the crankshaft sensor 14 and performs combustion calculations for each cylinder in the engine firing sequence. An engine control module 18, which may include pressure controller 16, provides overall monitoring and control of all engine functions, including, for example, timing and duty cycle of the fuel injectors and EGR valve (not shown), and feeds back relevant engine data to controller 16 for making the combustion calculations. For exemplary purposes, the engine shown is a diesel V8, but the invention is applicable to any form of spark-ignited or compression-ignited engine.

Figure 2:
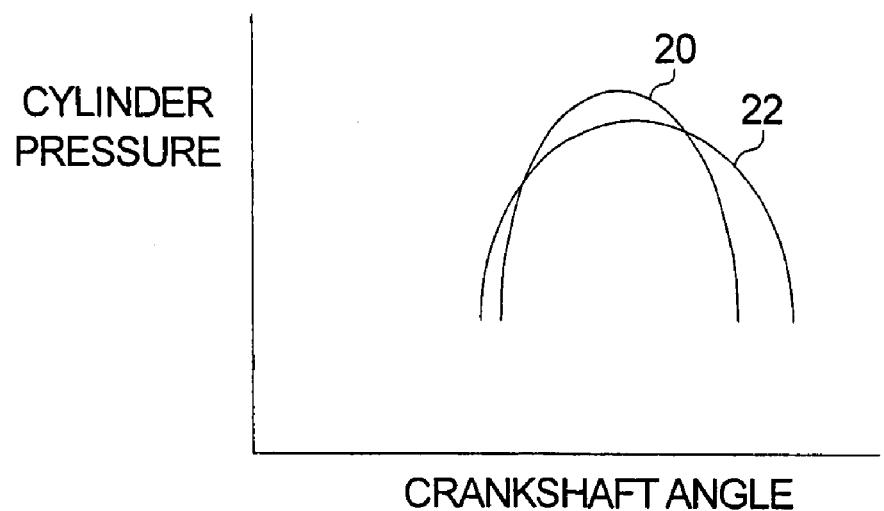
FIG. 2 is an idealized graph showing the effect on cylinder pressure of varying the EGR content of the combustion mixture.

In accordance with the present invention, EGR may be added to the air intake manifold of engine 10 to limit globally the peak pressures in all the cylinders of a multi-cylinder engine during combustion, as described above. Referring now to FIG. 2, Curve 20 represents the cylinder pressure during the compression and exhaust stroke as a function of crankshaft angle, for combustion of a mixture having a relatively low EGR content. Curve 22 represents the same cylinder wherein the EGR content of the mixture is substantially increased. It is seen that as EGR is increased, the peak pressure in the cylinder decreases because the combustion rate is reduced; hence, the combustion process is spread over a wider angular range. As the cylinder pressure approaches a maximum pressure limit, the EGR level can be increased to limit the pressure, in accordance with the invention. Using EGR to control the peak cylinder pressure allows the same fueling rate and approximately the same torque production, when the combustion angle is held relatively constant, both of which are significant improvements upon the prior art.

Figure 3:
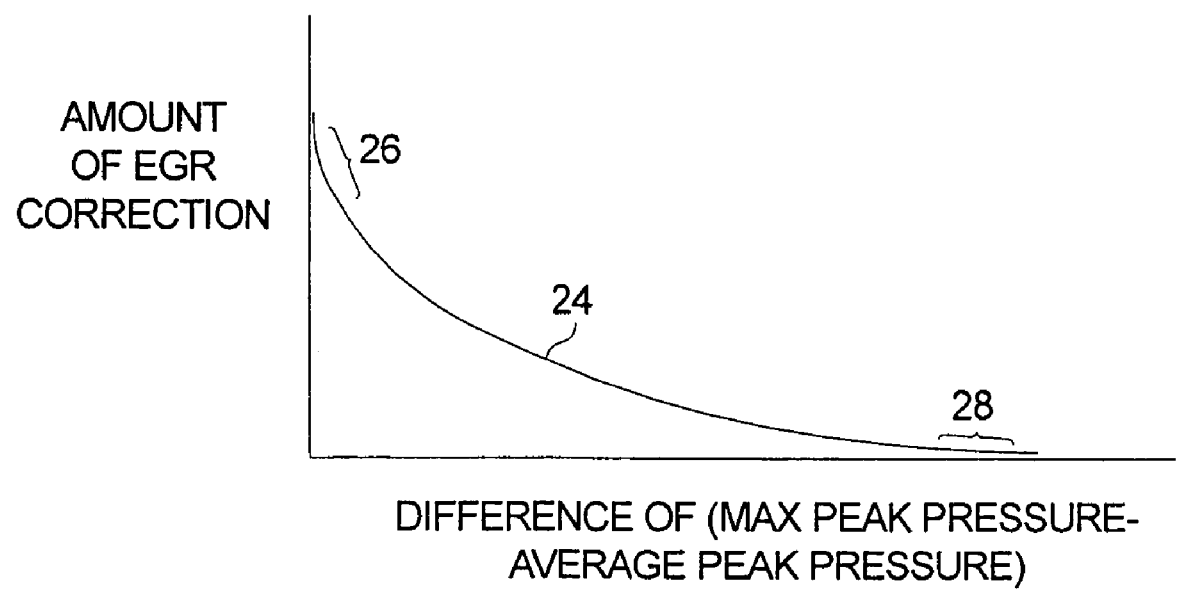
FIG. 3 is an idealized graph showing the amount of EGR correction required as a function of the difference between maximum allowable peak pressure and average peak pressure (pressure error)

The amount of EGR correction can be a function of the difference of the maximum peak pressure and the average peak pressure of all the cylinders. Referring to Curve 24 in FIG. 3, as the average peak pressure approaches the maximum peak pressure, as in Region 26, the amount of required EGR correction will increase rapidly. When the difference is large, as in Region 28, the amount of correction can be zero. The function can be tailored to prevent the EGR from causing engine surge by the tailoring the slope of the function.

Figure 4:
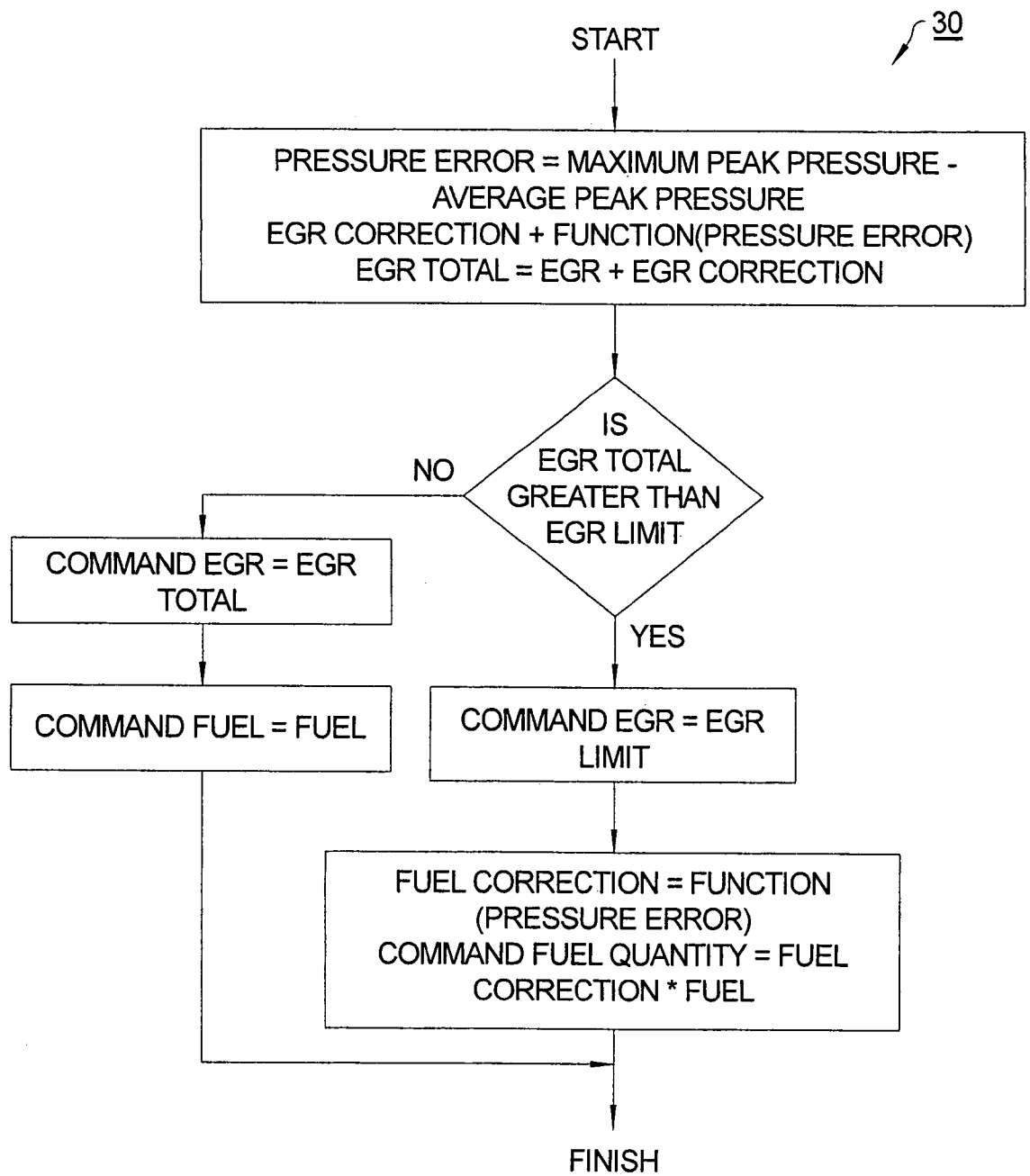
FIG. 4 is an algorithm for varying EGR percentage and rate of fueling in the combustion mixture as shown in FIG. 3 to control globally the average peak pressure.

Referring to FIG. 4, an algorithm 30 is shown for management of EGR addition. The amount of additional EGR introduced cannot exceed an EGR Limit established for the engine. The Pressure Error is the difference between the Maximum Peak Pressure (also referred to herein as the Maximum Allowable Pressure) and the Average Peak Pressure (see FIG. 3) as determined by controller 16 (FIG. 1). The EGR Correction is a pressure correction of the calculated amount of EGR for a specific peak pressure. When the total amount of EGR introduced for purposes of controlling the average cylinder pressure is less than or equal to the EGR limit, the fueling rate need not be changed from the commanded fuel amount. That is, no fueling adjustment will be made to the commanded fuel quantity to trim the average cylinder pressure. However, when the total amount of EGR that is to be introduced is greater than the EGR limit, then the EGR is commanded to only the EGR limit, and fueling adjustment can intervene to prevent the cylinder pressure from exceeding the pressure limit. The command EGR is held at the EGR limit while the Command Fuel is reduced to prevent the cylinder pressure from exceeding the Maximum Peak Pressure.

Figure 5:
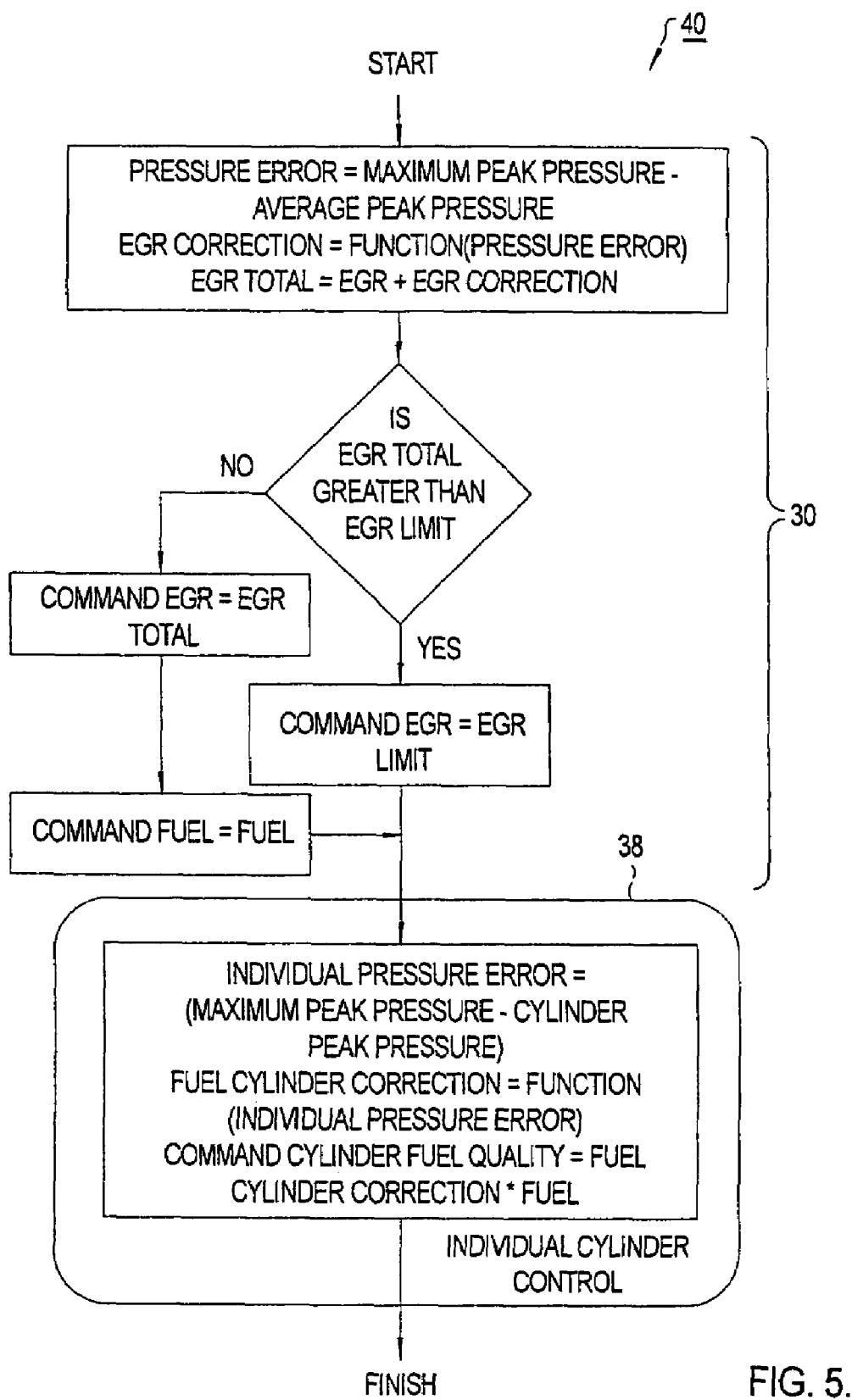
FIG. 5 is an algorithm including the algorithm shown in FIG. 4, showing control of fuel injection to each cylinder to trim the individual cylinder peak pressures.

The fuel correction can also be applied to an individual cylinder control 38 as shown in algorithm 40 in FIG. 5. The EGR limit is calculated from the engine parameters to prevent the air/fuel ratio from going rich. Using an oxygen sensor in the exhaust to derive an Air/Fuel ratio can also be used to calculate the EGR limit.

The individual cylinder control can always monitor each cylinder, while the EGR control can monitor only the average pressure operation.

Figure 6:
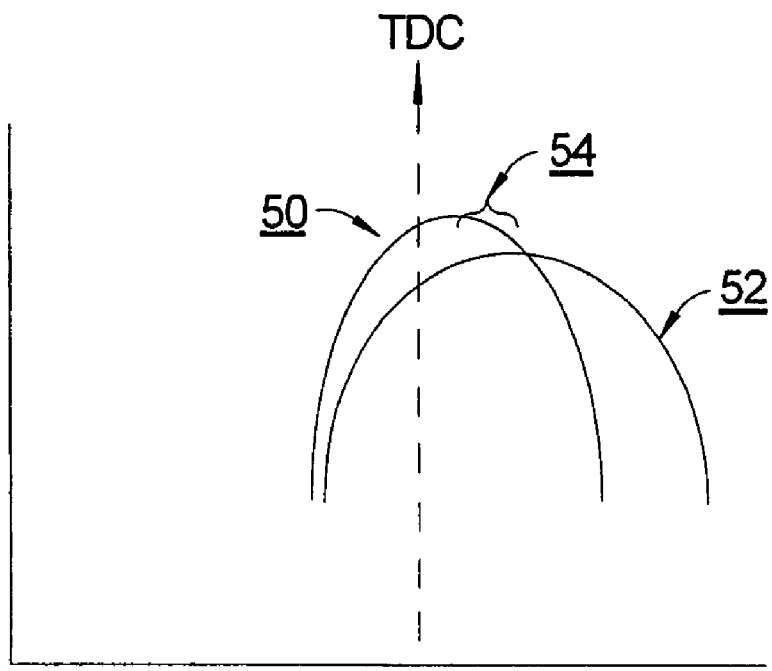
FIG. 6 is an idealized graph showing the effect of varying fuel injection timing on control of cylinder pressure.
Figure 7:
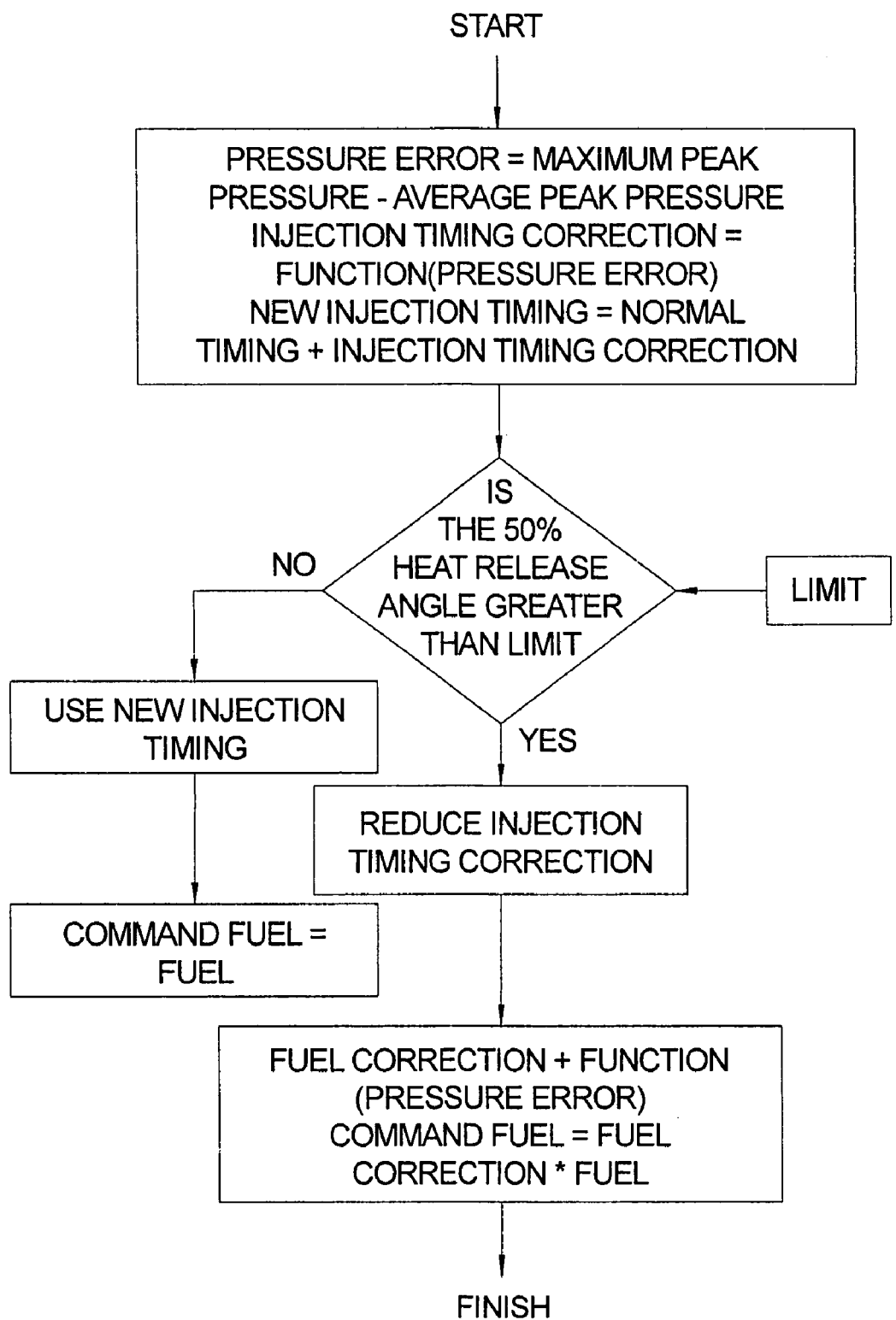
FIG. 7 is an algorithm for varying fuel injection timing to trim the maximum pressure in each individual cylinder.

Referring now to FIGS. 6 and 7, the combustion phase angle can also control the value of peak pressure of the combustion process. Curve 50 shows the cylinder pressure curve for a normal timing of fuel injection in engine 10 (FIG. 1). A 50% heat release angle is defined in the art as the crank angle, relative to Top Dead Center (TDC), at which the heat release value in the particular cylinder is one-half the total heat release of the cylinder during its cylinder event. If the 50% heat release angle is delayed after TDC, the maximum cylinder pressure will decrease, as shown in Curve 52. If the range of delay is limited to a predetermined value, the torque production may be reduced slightly. This is a method to control the peak cylinder pressure without reducing the fueling quantity or causing a large change in torque production, again an important improvement over methods of the prior art. By delaying 54 the fuel injection timing until after TDC, the cylinder pressure is increasing when the cylinder is moving down on the power stroke of the engine. As shown in algorithm 60, if the 50% heat release angle can be maintained within a specified number of degrees of TDC, for example, 15 degrees, the torque production from combustion will be only slightly reduced.

If the peak cylinder pressure is still above the pressure limit and the 50% heat release angle is at 15 degrees or greater, then the fuel amount can be reduced to maintain a cylinder pressure at or below the maximum cylinder pressure.

Other combustion angles can be modulated for purposes of controlling individual cylinder pressure, other than the 50% heat release angle. For examples, instead of adjusting a 50% heat release angle, a 50% mass fraction burn angle (a 50% mass fraction burn angle is defined in the art as the crank angle, relative to TDC, at which the Mass Fraction Burn exceeds 0.5) or a start of combustion angle can be adjusted. Further, instead of a 50% heat release angle, a 10% heat release angle can be used; and instead of a 50% mass fraction burn angle, a 10% mass fraction burn angle can be used.

Variable valve timing, as is well known in the prior art, can be substituted as the control variable in place of EGR. Again, the control is global control of maximum cylinder pressure in all cylinders, like EGR control.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for controlling pressure in a cylinder of an internal combustion engine below a maximum allowable firing pressure, comprising the steps of:
   a) measuring a peak firing pressure in said cylinder during a firing cycle thereof;
   b) comparing said measured peak firing pressure against said maximum allowable firing pressure to determine a pressure difference;
   c) calculating from said pressure difference an amount of recirculated exhaust gas to be added in dilution to a fuel-air mixture for said cylinder to reduce the resulting peak firing pressure in said cylinder in a subsequent firing cycle to a pressure value no more than said maximum allowable firing pressure; and
   d) providing said calculated diluted fuel-air mixture to said cylinder.

2. A method in accordance with claim 1 wherein said engine has a plurality of cylinders, and wherein each of said cylinders is provided with a pressure sensor, and wherein said measured peak firing pressure is an average of the measured peak firing pressures in said plurality of cylinders, and wherein said calculating and providing steps are provided to all of said plurality of cylinders.

3. A method in accordance with claim 2 comprising the further steps of:
   a) calculating from said pressure difference an amount of fuel to be added to an incoming air charge to provide an adjusted fuel-air mixture for said cylinder to reduce the resulting peak firing pressure in said cylinder in a subsequent firing cycle to a pressure value no more than said maximum allowable firing pressure; and
   b) providing said adjusted fuel-air mixture to said cylinder.

4. A method in accordance with claim 2 comprising the further steps of:
   a) calculating from said pressure difference an optimum timing schedule for energizing of a plurality of fuel injectors for said plurality of cylinders to reduce the resulting peak firing pressure in said cylinder in a subsequent firing cycle to a pressure value no more than said maximum allowable firing pressure; and
   b) energizing said plurality of fuel injectors according to said calculated optimum timing schedule.

5. A method in accordance with claim 4 wherein said calculating and energizing steps are carried out for each individual fuel injector.

* * * * *